(12) United States Patent
Thalmann et al.

(10) Patent No.: US 9,108,131 B2
(45) Date of Patent: Aug. 18, 2015

(54) FILTER ELEMENT, A FILTER SET, AND A FILTER DEVICE

(71) Applicant: MANN+HUMMEL GMBH, Ludwigsburg (DE)

(72) Inventors: Christian Thalmann, Speyer (DE); Christian Kocksch, Roemerberg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 14 days.

(21) Appl. No.: 13/854,070

(22) Filed: Mar. 30, 2013

(65) Prior Publication Data
US 2013/0256206 A1 Oct. 3, 2013

(30) Foreign Application Priority Data
Mar. 30, 2012 (DE) .......................... 10 2012 006 417

(51) Int. Cl.
*B01D 27/08* (2006.01)
*B01D 35/30* (2006.01)
*B01D 29/96* (2006.01)

(52) U.S. Cl.
CPC ............... *B01D 35/30* (2013.01); *B01D 27/08* (2013.01); *B01D 29/96* (2013.01); *B01D 35/306* (2013.01); *B01D 2201/295* (2013.01); *B01D 2201/30* (2013.01); *B01D 2201/301* (2013.01); *B01D 2201/302* (2013.01); *B01D 2201/4084* (2013.01)

(58) Field of Classification Search
CPC ...... B01D 27/08; B01D 35/30; B01D 35/306; B01D 2201/295; B01D 2201/301; B01D 2201/30
USPC .................................................. 210/232, 444
See application file for complete search history.

(56) References Cited

U.S. PATENT DOCUMENTS

| | | | | |
|---|---|---|---|---|
| 6,533,933 | B1 * | 3/2003 | Stankowski et al. | 210/232 |
| 7,882,961 | B2 * | 2/2011 | Menez et al. | 210/455 |
| 2006/0180539 | A1 * | 8/2006 | Wolf et al. | 210/232 |
| 2007/0039864 | A1 * | 2/2007 | Dworatzek et al. | 210/235 |
| 2010/0101993 | A1 * | 4/2010 | Wells et al. | 210/455 |
| 2011/0100893 | A1 * | 5/2011 | Kocksch et al. | 210/236 |

FOREIGN PATENT DOCUMENTS

| | | |
|---|---|---|
| DE | 102005007024 A1 | 8/2006 |
| DE | 102009048412 B3 * | 2/2011 |
| EP | 0880987 A1 | 12/1998 |
| WO | WO03082434 A1 | 10/2003 |
| WO | WO2009005499 A1 | 1/2009 |

* cited by examiner

*Primary Examiner* — Thomas M Lithgow
(74) *Attorney, Agent, or Firm* — James Hasselbeck

(57) ABSTRACT

A filter element for a motor vehicle for filtering a fluid has engaging and/or receiving elements that are designed to be connected to an adapter ring. The engaging and/or receiving elements have several hooks for engaging recesses of the adapter ring. and are arranged uniformly spaced in a circumferential direction about an central axis of the filter element. A filter set includes the filter element and the adapter ring, wherein the adapter ring deactivates a locking device of a first housing part that receives the filter element.

4 Claims, 3 Drawing Sheets

FILTER ELEMENT, A FILTER SET, AND A FILTER DEVICE

CROSS REFERENCE TO RELATED APPLICATIONS

This application claims priority from German patent application no. DE 10 2012 006 417.9, filed with the German Patent and Trade Mark Office (DPMA) on Mar. 30, 2012, the entire disclosure of which in incorporated herein by reference.

BACKGROUND OF THE INVENTION

The invention concerns a filter element, a filter set, and a filter device, in particular for combustion air or compressed air, fuel, in particular diesel fuel or gasoline, motor oil or hydraulic oil.

Filter elements for filtering a fluid as well as filter devices with such filter elements are used, for example, in motor vehicles or industrial motors for filtration of combustion air or compressed air, fuel, in particular diesel fuel or gasoline, motor oil or hydraulic oil. Depending on the filter element, it may be necessary to exchange them after a certain amount of time, for example, because the filter elements have reached the limit of their filtering capacity.

For example, DE 10 2009 048 412 B3 discloses a securing device which prevents closure of a housing for receiving a filter element in case of a missing, non-fitting or wrongly installed filter element. In this way, it is ensured that the filter device cannot be operated with a wrong filter element, i.e., with a filter element of a different type. This prevents malfunctions and damages.

SUMMARY OF THE INVENTION

It is therefore an object of the present invention to provide an improved filter element, an improved filter set, and an improved filter device. In particular, simple manufacture should be ensured.

Accordingly, a filter element for filtering a fluid, in particular for a motor vehicle, is provided comprising engaging and/or receiving elements for connecting the filter element to an adapter ring.

Since the filter element and the adapter ring are separate parts, in particular the filter element can be produced more easily in comparison to a one-part filter element with adapter ring. The filter element can comprise engaging elements; receiving elements; or engaging elements and receiving elements. The filter element can thus be connected form-fittingly with the adapter ring. The connection between the filter element and the adapter ring can be designed to be detachable (releasable) or non-detachable (non-releasable). An example of a non-releasable form-fitting connection can be clips which interact with appropriate holes.

The filter element can be embodied for filtration of gases or liquids. In particular, the filter element is embodied for filtering combustion air or compressed air, fuel, in particular diesel fuel or gasoline, motor oil or hydraulic oil.

In the mounted position, the engaging and/or receiving elements are preferably arranged, relative to the direction of action of the force of gravity, at the top of the filter element. The connection between the filter element and the adapter ring can then be designed such that it is enhanced by the force of gravity. For example, the force of gravity can secure the hooks, described in the following, in the recesses.

According to one embodiment, the engaging and/or receiving elements comprise several hooks which are designed such that they engage recesses in the adapter ring. The hooks can be extending, for example, radially in outward direction relative to a center axis of the filter element. The recesses can be formed integrally at an end face of the adapter ring.

According to a further embodiment, the engaging and/or receiving elements are arranged in the circumferential direction about a center axis of the filter element at a uniform spacing to each other. In this way, a simpler manufacture of the filter element is provided, in particular distortion of the filter element is at least reduced. Preferably, the engaging elements are arranged on the circumference of the end disk, in particular a top end disk of the filter element.

Moreover, a filter set, in particular for a motor vehicle, is proposed comprising a filter element for filtering a fluid, in particular the filter element according to the invention, and an adapter ring. The adapter ring is designed such that it deactivates a locking device that is arranged on a first housing part for receiving the filter element.

By means of the locking device, it is ensured that the first housing part cannot be closed by means of a second housing part when the filter element is missing, non-fitting, e.g. because it is of a different type, or because the filter element is installed in the wrong way. This can prevent, as already disclosed above, malfunctions and damages. The "deactivation" can be realized, for example, in that the adapter ring is designed such that it supplements and completes a surface, for example a surface that is provided on a second housing part for receiving the filter element, so that an engagement of the locking device in otherwise accessible recesses is prevented.

According to one embodiment, the filter element is connectable to the adapter ring. This can be achieved, for example, by means of the afore described engaging and/or receiving elements on the filter element.

However, it is also conceivable that the filter element is fastened in the first housing part and/or the second housing part while the adapter ring, separate from (not connected to) the filter element, is arranged at a different location in order to deactivate the locking device.

The filter element can be centered by means of the adapter ring or the first and/or second housing part relative to a connector for integrating the filter element into a fluid circuit or a fluid stream.

According to a further embodiment, the adapter ring, for deactivation of the locking device, is provided with at least one engaging element for closing a corresponding receiving element of a second housing part for receiving the filter element and/or is provided with at least one receiving element for receiving a corresponding engaging element of the second housing part for receiving the filter element. In this way, a supplemented and completed surface is provided in a simple way in which the locking device therefore cannot engage when the adapter ring and the second housing part are engaging each other.

Alternatively, an adapter ring is also conceivable which covers receiving elements in the second housing part completely and therefore forms a continuous surface. Completing (supplementing) the corresponding surface of the second housing part is then not required.

According to a further embodiment, the adapter ring comprises an annular element on which outwardly in radial direction several engaging elements in the form of tabs are provided that are designed to engage each a corresponding receiving element in the form of a recess in a circumferential rim of the second housing part. This provides a simple configuration.

Moreover, a filter device, in particular for a motor vehicle, is proposed. The filter device comprises the filter set according to the invention, a first housing part and a locking device. The first housing part receives the filter element. The locking device is arranged on the first housing part and is deactivated by means of the adapter ring.

The wording "the first housing part receives the filter element" is to be understood such that the first housing part together with the second housing part forms a hollow space or cavity in which the filter element is received and/or the first housing part itself has a cavity in which the filter element is at least partially received. The same holds true for the wording that the second housing part receives the filter element.

According to one embodiment, the locking device has a radial spring-pretensioned plunger that is designed to glide along a surface that is supplemented and completed by the adapter ring. When the adapter ring is not present, for example, because a filter element of another, incompatible, type is used, the plunger engages the corresponding recess, for example, in the second housing part so that screwing in, or continuing to screw in, the second housing part into the first housing part is prevented.

According to a further embodiment, the filter device has a second housing part which receives the filter element and is screw-connected to the first housing part, wherein the second housing part has a rim that is pointing or facing in the direction of the first housing part and that is supplemented by the adapter ring for forming the supplemented and thus completed (continuous) surface. In this way, a simple configuration is provided.

According to a further embodiment, the first housing part is designed as a filter head wherein the filter head has a fastening flange for mounting the filter device. Moreover, in the filter head has a hand pump for conveying the fluid to be filtered may be integrated.

Further possible implementations of the invention comprise also combinations, not explicitly mentioned, of features or embodiment variants of the filter element, the filter set, or the filter device that have been disclosed above or will be discussed in the following with regard to the embodiments. In this connection, a person of skill in the art will add or modify individual aspects as improvements or supplements of the respective basic form of the invention.

Further configurations of the invention are the subject matter of the dependent claims as well as of the embodiments of the invention disclosed in the following. In the following, the invention will be disclosed in more detail with the aid of illustrated embodiments with reference to the attached drawings.

BRIEF DESCRIPTION OF THE DRAWING

In the Figures, same reference characters identify the same or functionally the same elements, inasmuch as nothing to the contrary is mentioned.

DESCRIPTION OF THE PREFERRED EMBODIMENTS

Figure 1:
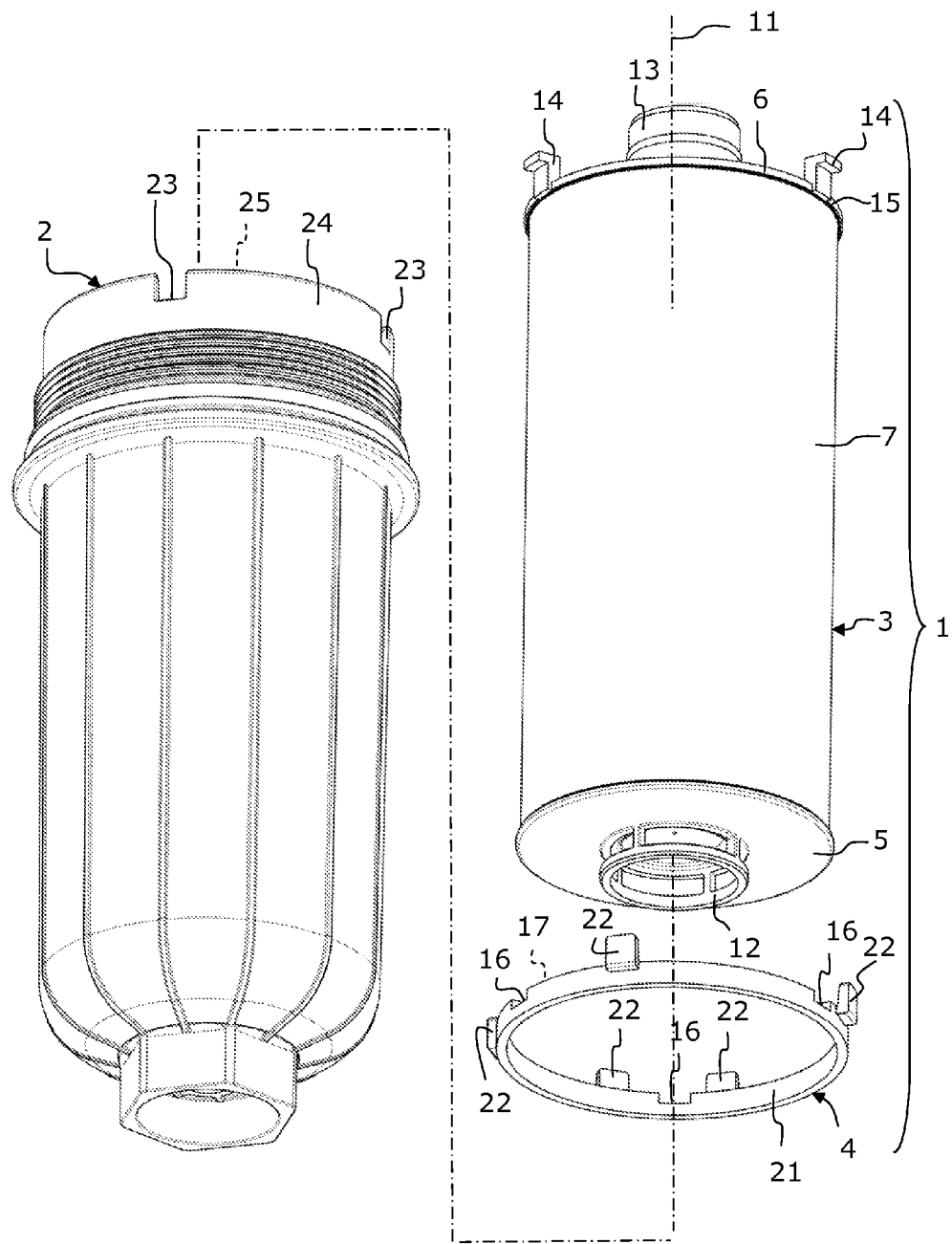
FIG. 1 shows an exploded perspective illustration of a filter set including a housing part.

FIG. 1 shows an exploded view a filter set 1 as well as a housing in the form of a cup 2.

The filter set 1 comprises a filter element 3 as well as an adapter ring 4. The filter element 3 is comprised, for example, of two end disks 5, 6 and a filter medium in the form of a bellows 7 arranged between the end disks 5, 6. The bellows 7 has, for example, a circular cross-section (not illustrated) and extends along a center axis 11 which is at the same time also a center axis of the filter element 3. In this context, the terms radial, axial, and circumferential direction relate to the center axis 11 of the filter element 3. The bellows 7 is, for example, configured as a zigzag folded flat filter medium. For reinforcing the filter element 3 and for absorption of pressure differences, a support member in the form of a central tube 12 is provided within the bellows 7. Also, the filter element 3 has at one end a connecting socket 13 by means of which the filter element is integrated into a fluid stream or fluid socket. Typically, fluid to be filtered flows in operation of the filter device through the bellows 7 from the exterior to the interior and the filtered fluid is discharged through the connecting socket 13. The filtered fluid can be a liquid, for example, fuel, or a gas, for example, air.

On the end disk 6 correlated with the connecting socket 13 there are several, for example, three, engaging elements in the form of hooks 14. Because of the viewing angle of FIG. 1, the third hook is not visible in FIG. 1. The end disk 6 forms in the mounted position of the filter element 3, as will be apparent also in connection with FIG. 4 later on, a top end disk relative to the direction of the force of gravity. The hooks 14 can be, for example, embodied in an L shape as illustrated in FIG. 1. Preferably, the hooks 14 are formed on the outer rim 15 of the end disk 6.

The hooks 14 are designed to engage appropriate recesses 16 in the adapter ring 4. The hooks 14 are arranged in the circumferential direction at a uniform spacing relative to each other. The recesses 16 are arranged likewise. The recesses 16 are formed at an end face 17 (hidden in the illustration of FIG. 1) of an annular element 21 of the adapter ring 4.

The filter element 3 can be connected with the adapter ring 4 in a simple way in that the filter element 3 is suspended from the adapter ring 4. The force of gravity secures than the hooks 14 in the recesses 16.

The adapter ring 4 has, for example, five tabs 22 which are formed in radial direction outwardly on the annular element 21. The tabs 22 are designed such that they each engage the corresponding receiving element in the form of a recess 23 of the cup 2. The tabs 22 are distributed in circumferential direction at a non-uniform spacing. In this way, a pre-defined coding with respect to a cup 2 or a certain arrangement of the recesses 23 is provided. This means that only a certain adapter ring 4 matches the configuration of the cup 2. The implications will be explained in more detail in connection with FIG. 4.

The cup 2 is designed such that in its interior the filter element 3 can be received largely. The cup 2 has a rim 24 at its open end. The recesses 23 are integrally formed in an end face 25 (indicated in dashed lines because hidden in FIG. 1) of the rim 24.

Figure 2:
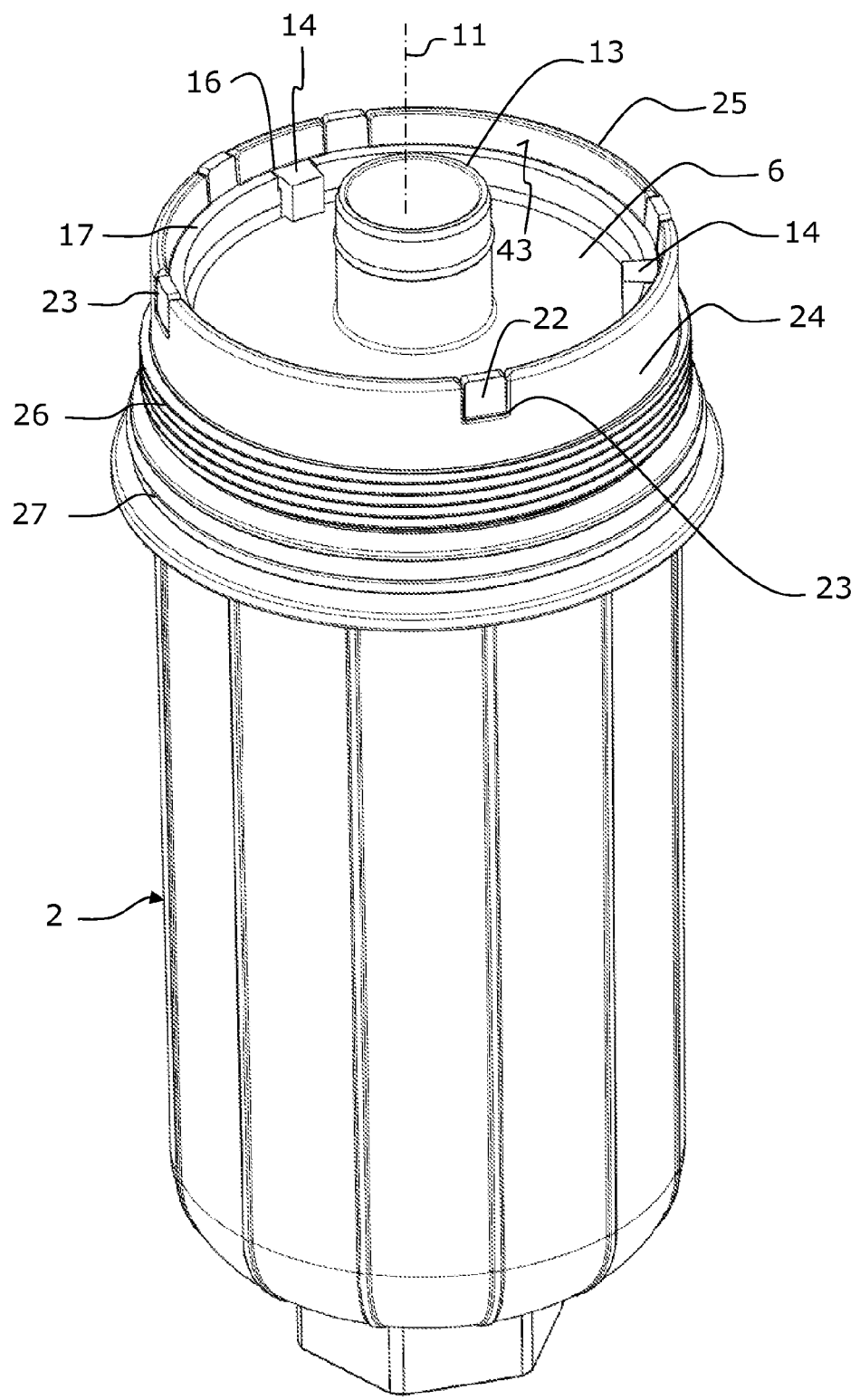
FIG. 2 shows in a perspective view the components of FIG. 1 in the assembled state.

FIG. 2 shows in a perspective view the filter set 1 and the cup 2 of FIG. 1 in the assembled state. It can be seen that the tabs 22 of the adapter ring 4 engage the corresponding recesses 23. In the installed position, the force of gravity secures engagement of the tabs 22 in the recesses 23.

The open end of the cup 2 has an outer thread 26 and a sealing section 27. Relative to the end face 25 of the rim 24 the outer thread 26 can be arranged behind the recesses 23 and the sealing section 27 can be arranged behind the outer thread 26.

Figure 3:
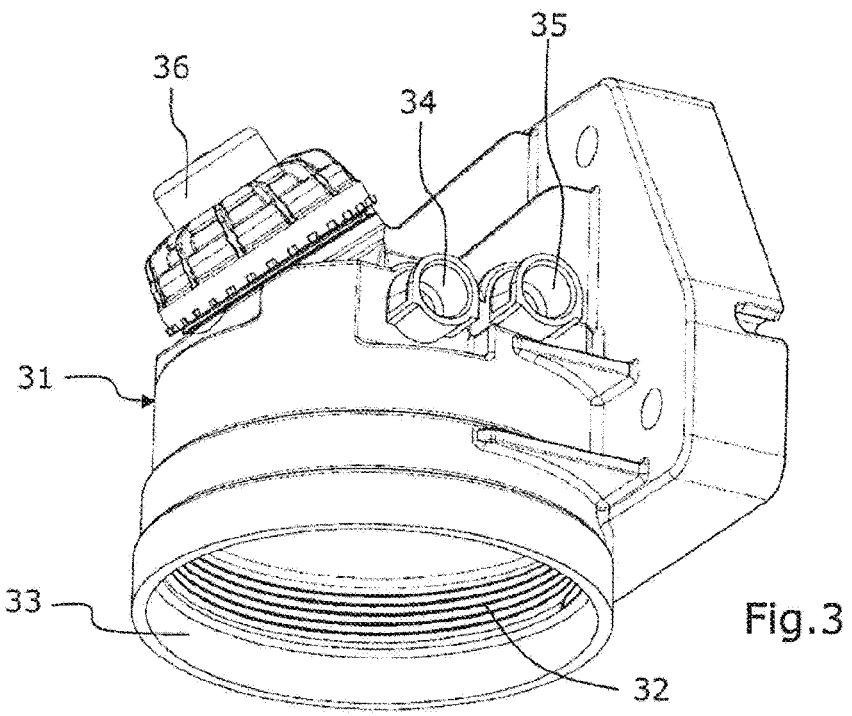
FIG. 3 is a perspective view of a complementary housing part.

FIG. 3 shows in a perspective view a housing part in the form of a filter head 31. The filter head 31 has an inner thread 32 into which the outer thread 26 of the cup 2 can be screwed. When screwing in the cup 2, sealing section 27 contacts a corresponding sealing section 33. This makes it possible to connect the cup 2 with the filter head 31 in a fluid-tight manner. Moreover, the filter head 31 can have connectors 34, 35 for supplying fluid to be filtered or discharging filtered fluid. Moreover, the filter head 31 can be provided with a hand pump 36 for draining excess fluid pressure.

In the assembled state, the components described in connection with FIGS. 1 to 3 form the filter device 37 illustrated in section in FIG. 4.

Figure 4:
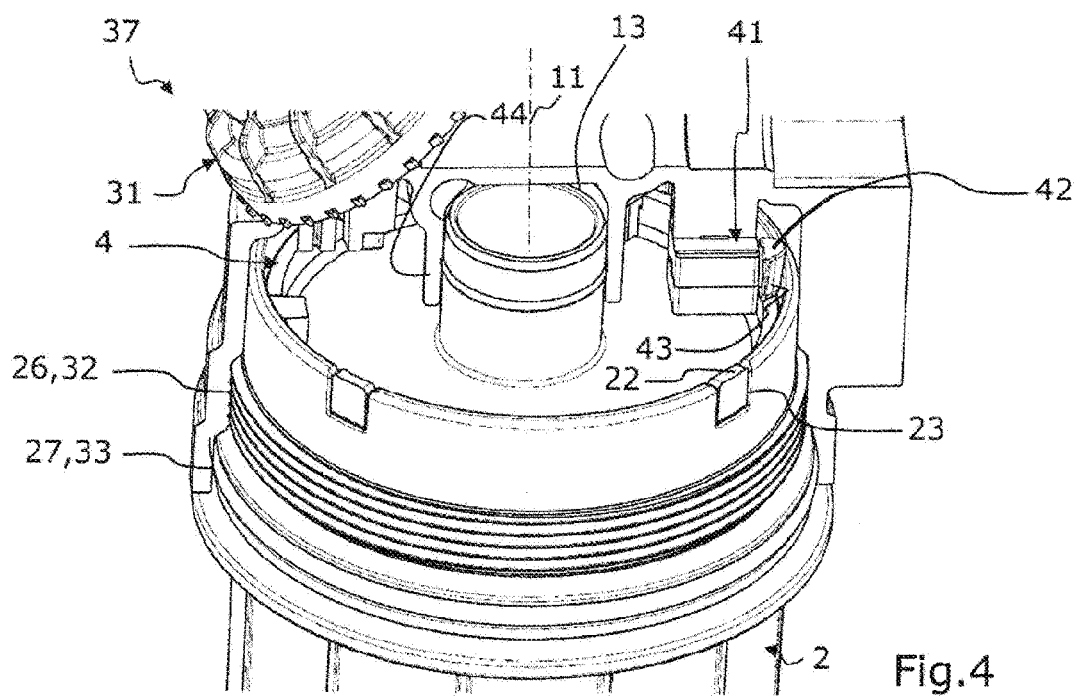
FIG. 4 shows a detail view of a filter device which comprises the components illustrated in FIGS. 1 to 3.

FIG. 4 shows that the filter head 31 also has a locking device 41 including a plunger 42 that projects in radial direction outwardly and is spring-pretensioned. The spring plunger 42 acts radially in outward direction against a supplemented and completed inner surface 43. The completed inner surface 43 is formed in that, as shown in FIG. 2, the tabs 22 are aligned with the rim 24 of the cup 2, i.e., the recesses 23 are closed by means of the tabs 22. In this way, it is possible to prevent the spring plunger 42 in FIG. 4 from engaging any of the recesses 23 as would be the case if the adapter ring 4 were not provided. The locking device 41 in the state illustrated in FIG. 4 is thus deactivated as a result of the presence of the adapter ring 4. The activated state of the locking device 41 (i.e., when no adapter ring 4 or an adapter ring 4 of the wrong type is present) corresponds to the state in which the plunger 42 engages one of the recesses 23 and therefore prevents a further screwing in of the cup 2 into the filter head 31.

In the deactivated state of the locking device 41 as shown in FIG. 4, the cup 2 is completely threaded into the filter head 31 wherein the connecting socket 13 engages on the exterior side in a seal-tight fashion a corresponding receptacle 44 of the filter head 31 so that by means of the connecting socket 13 and the receptacle 44 filtered fluid can be discharged safely.

According to another embodiment, the adapter ring 4 can be formed without tabs 22. In this embodiment, the adapter ring 4 covers in a different way the recesses 23. For example, the adapter ring 4 for this purpose could be provided with a circumferentially closed (continuous) annular inner surface which, in the assembled state illustrated in FIG. 4, is positioned in radial direction on the inner side in front of the recesses 23 and therefore covers them. In this way, the plunger 42 is also prevented from engaging the recesses 23.

While specific embodiments of the invention have been shown and described in detail to illustrate the inventive principles, it will be understood that the invention may be embodied otherwise without departing from such principles.

What is claimed is:

1. A filter set for a motor vehicle, the filter set comprising:
    an adapter ring;
    a filter element including:
        a filter medium;
        an end disk secured to the filter medium;
        engaging or receiving elements secured to said filter element, said engaging and/or receiving elements comprise a plurality of hooks adapted to detachably engage into recesses of the adapter ring;
    wherein the hooks are formed on the radially outer rim of the end disk and extend therefrom axially outwardly away from the filter medium; and
    wherein the adapter ring is a separate component from the filter element, the adapter ring removably received over a radial exterior of the filter element and removably held in engagement with the engaging and/or receiving elements by the force of gravity;
    wherein the adapter ring is adapted to deactivate a locking device of a first housing part that receives the filter element;
    wherein the adapter ring is an annular ring element having an upper annular end face having the recesses adapted to receive the plurality of hooks of the filter element;
    wherein the annular ring element on its radially outer side includes a plurality tabs protruding radially outwardly from the ring element, the tabs configured for engaging into matching recesses in a second housing part when the adapter ring is installed into the second housing part.

2. The filter set according to claim 1, wherein
    the engaging and/or receiving elements are arranged uniformly spaced in a circumferential direction about a central axis of the filter element.

3. The filter set according to claim 1, wherein
    the hooks are L-shaped hooks comprising:
        a first leg having a first send secured onto the radially outer rim of the end disk and then extending in an axial direction outwardly away from the filter element to an opposing second end;
        a second leg having an first end secured to the opposing second end of the first leg, the second leg extending in a radial direction outwardly away from the filter element and first leg.

4. A filter device for a motor vehicle, the filter device comprising:
    a filter set comprising a filter element received in the first housing part, the filter element comprising:
        a filter medium;
        an end disk secured to the filter medium;
        engaging or receiving elements secured to said filter element, said engaging and/or receiving elements adapted to be detachably connected to an adapter ring;
        wherein the engaging and/or receiving elements comprise a plurality of hooks adapted to detachably engage into recesses of an adapter ring removably received over a radial exterior of the filter medium; and
        wherein the hooks are formed on the radially outer rim of the end disk and extend therefrom axially outwardly away from the filter medium;
    wherein the adapter ring is received over a radial exterior of the filter element;
    a first housing part having a locking device;
    a second housing part that receives the filter element and is screw-mounted to the first housing part;
    wherein the second housing part has a rim that is facing the and said adapter ring includes means to supplement a surface of said rim; and
    wherein the locking device comprises a radially spring-pretensioned plunger adapted to slide along said supplemented surface of said second housing part and said locking device is deactivated by said adapter ring and said supplemented surface.

* * * * *